United States Patent [19]
Holbrook et al.

[11] Patent Number: 5,957,578
[45] Date of Patent: Sep. 28, 1999

[54] STAND MIXER WITH HEAD LOCKING MECHANISM

[75] Inventors: Paul R. Holbrook, Buffalo Grove, Ill.; Robert A. St. John, Cheshire, Conn.

[73] Assignee: HP Intellectual Corp., Wilmington, Del.

[21] Appl. No.: 09/073,696

[22] Filed: May 7, 1998

[51] Int. Cl.⁶ .................................................. B01F 15/00
[52] U.S. Cl. ............................................................ 366/197
[58] Field of Search .............................. 366/92–98, 197, 366/199, 200, 201, 207, 224, 349; 99/348; 70/192–198, 184, 187, 201, 202, 61, 62; 74/575, 577 R, 577 M

[56] References Cited

U.S. PATENT DOCUMENTS

| | | | |
|---|---|---|---|
| 2,054,666 | 9/1936 | Van Guilder | 366/201 |
| 2,462,089 | 2/1949 | Frisbie | 366/197 |
| 4,026,532 | 5/1977 | Madan | 366/94 |
| 5,782,558 | 7/1998 | Roberts | 366/98 |

*Primary Examiner*—Charles E. Cooley
*Attorney, Agent, or Firm*—Barry E. Deutsch

[57] ABSTRACT

A food mixing appliance has a mixing head pivotably supported on a pedestal. The appliance includes a mechanism for locking the head relative to the pedestal in several discrete positions and for enabling the user to pivot the head relative to the pedestal into a selected one of the discrete positions. A mechanism includes a user actuated pivotable lever and first and second pivotable pawls. A member is fixed in position relative to the lever and includes slots defining a plurality of discrete positions for the pivotable head. Each of the pawls selectively engage a selected one of the slots corresponding to angular positions of 0°, 45° and 90° for the head relative to the pedestal.

17 Claims, 3 Drawing Sheets

STAND MIXER WITH HEAD LOCKING MECHANISM

BACKGROUND OF THE INVENTION

This invention relates to a food mixing appliance and in particular to a mechanism for locking a head of the appliance relative to the pedestal of the appliance at selected discrete angular positions.

Domestic food mixers can be categorized into two general types. The first type includes hand mixers which are generally light weight, portable, and are often used for mixing small amounts of material. The other type of mixer is the stand mixer, which may be used for mixing large quantities of food, heavy doughs, and other heavy foodstuffs.

Stand mixers typically include a pedestal or base to which a head is pivotably mounted. The head is pivotable relative to the pedestal to enable the user to readily change mixing implements or remove or insert the mixing bowl.

During the mixing action of heavy doughs and foodstuffs, very high forces are produced, which in turn tend to cause the head to pivot relative to the pedestal, even though the prior art stand mixers have included devices of various types which have attempted to lock the head in a fixed position relative to the pedestal. Accordingly, it is an object of this invention to firmly lock the head of a stand mixer relative to a pedestal at discrete angular positions.

SUMMARY OF THE INVENTION

The foregoing object and other objects of the present invention are attained in a food mixing appliance of a type having a mixing head pivotably supported on a pedestal. The mixing appliance includes a mechanism for locking the head relative to the pedestal at several discrete positions and for unlocking the head from the pedestal for freely pivoting the head relative to the pedestal. The locking mechanism includes a user actuated pivotable lever; a first pawl pivotably connected to the lever; and a second pawl spaced from the first pawl and pivotable in response to pivotable motion of the first pawl. Each of the pawls includes an arm. A member is fixed in position relative to the lever and includes means defining a plurality of discrete positions for said pivotable head relative to the pedestal. The arms of the pawls engage selected ones of said discrete position means for locking the head in the selected discrete position. The lever is pivoted to release the arms of the pawls from the discrete position means for enabling the head to be pivoted relative to said pedestal.

DESCRIPTION OF THE PREFERRED EMBODIMENT

Figure 1:
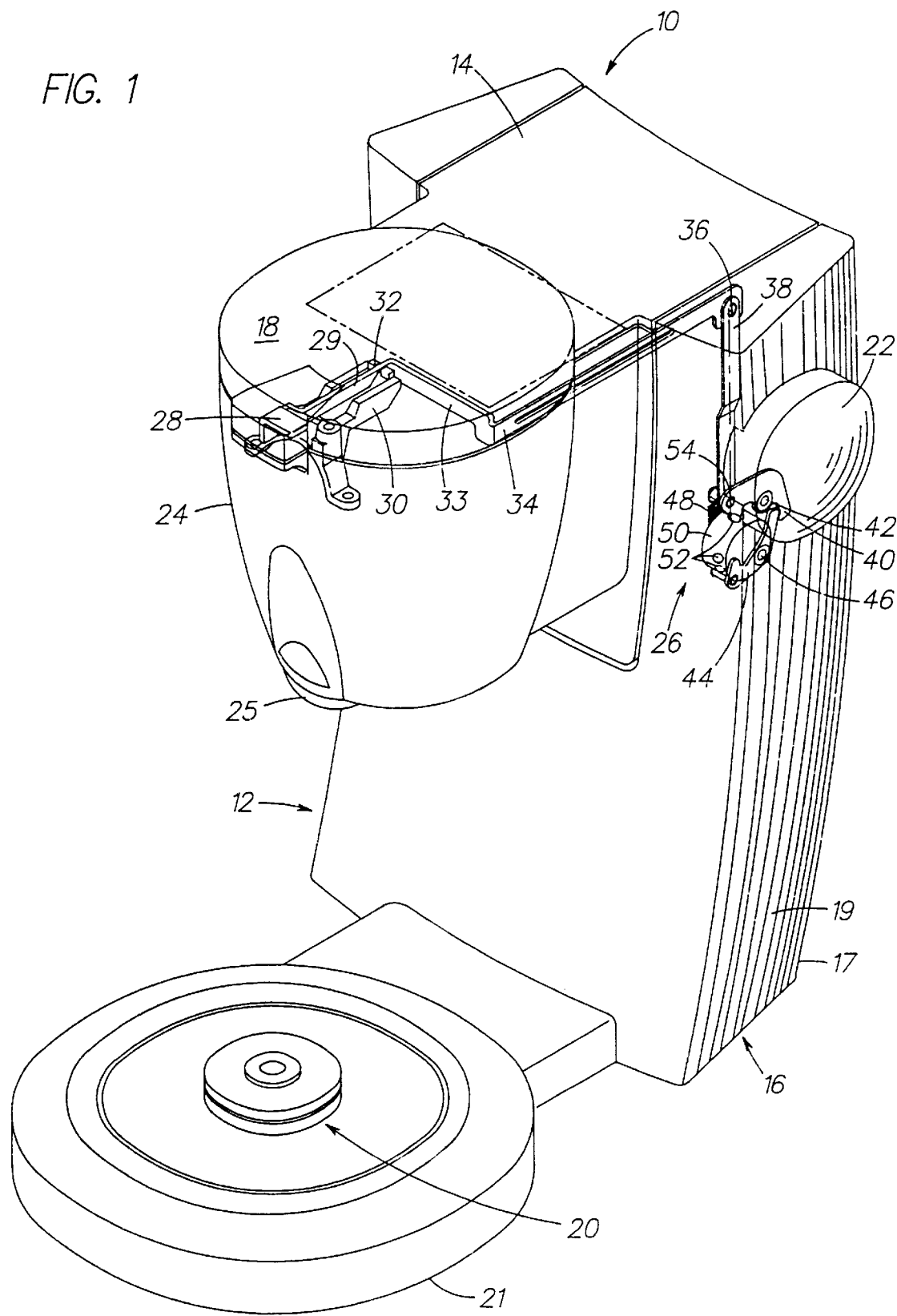
FIG. 1 is a perspective view of a stand mixer, partially in phantom, to show details of the locking mechanism of the present invention.

Referring now to the drawing, there is disclosed a preferred embodiment of the present invention. In referring to the various figures of the drawing, like numerals shall refer to like parts.

The present invention is embodied in a stand mixer 10 including a housing 12. Housing 12 includes a base or pedestal portion 16 and a head portion 14 pivotably connected to the pedestal portion. Pedestal portion 16 preferably comprises a generally L-shaped member having an upper upright portion 17 and a lower horizontally extending portion 21. Lower portion 21 includes a motor drive assembly 20 upon which the mixer's bowl (not shown) is mounted in driving engagement.

A rotary motor speed control 22 is mounted on vertically extending surface 19 of pedestal 16. Control 22 enables the user to control the speed of the mixer.

Housing 12 also includes a head cover 18. The front portion 24 of head 14 is somewhat cylindrical in shape and mounts therewithin the drive motor and drive gears for mixer 10.

As noted previously, head 14 is pivotable relative to pedestal 16. In the position shown in FIG. 1, the head is positioned relative to the pedestal so that it is in a generally horizontal plane. In such a position, a mixer accessory is mounted within drive housing 25 of the mixer and positioned within the mixing bowl for mixing foodstuffs such as bread or cake dough and the like.

Figure 2:
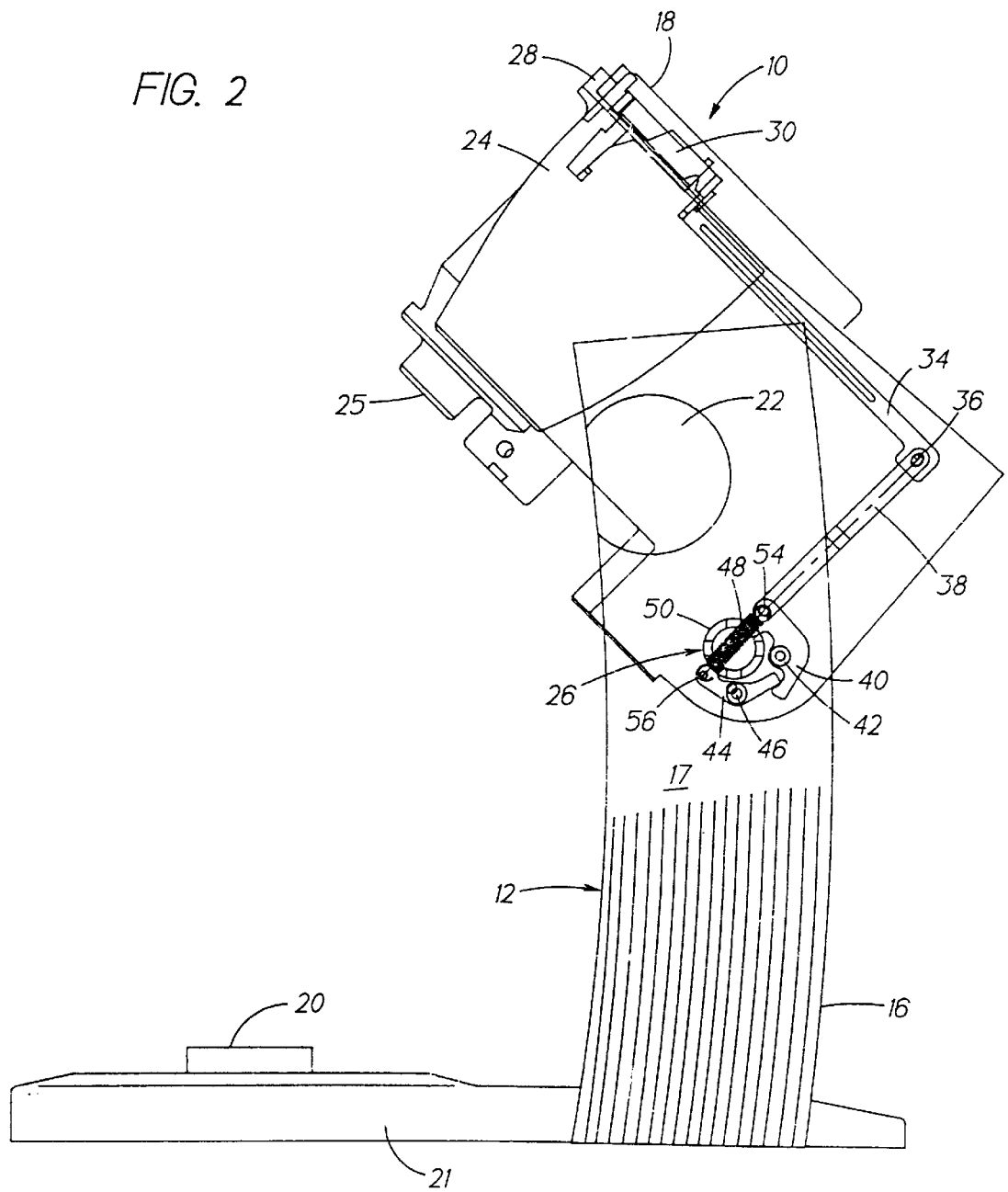
FIG. 2 is a side elevational view of the stand mixer illustrated in FIG. 1, with the head having been rotated in a clockwise direction relative to the mixer pedestal.

Head 24 may be rotated in a clockwise direction relative to pedestal 16 to achieve the position shown in FIG. 2. Rotation of the head to the position illustrated in FIG. 2 enables the user to readily remove or insert an accessory into the drive portion 25 of head 14.

During the mixing operation, the forces developed, particularly when the substance being mixed is heavy, tend to lift the head upwardly or rotate the head in a clockwise direction. Prior art stand mixers have included locking mechanisms which were intended to prevent the undesired movement of the head during operation of the stand mixer. However, such prior art locking mechanisms have not firmly locked the head in place, particularly against high forces generated during the mixing of heavy doughs or other foodstuffs.

The stand mixer 10 includes a locking mechanism 26 for providing firm locking of the head 14 relative to pedestal 16. Locking mechanism 26 includes a lever actuator 28 for enabling the user to unlock the mechanism to change the angular position of the head relative to the pedestal. Actuator 28 is positioned at the front of stand mixer 10 for user convenience. Actuator 28 is supported within a guide 30. Guide 30 is rigidly affixed to the inside portion of motor and gear housing portion 24. Guide 30 includes pivot 32.

Actuator 28 is connected to a first lever arm 29. Lever arm 29 in turn is connected to a horizontally extending lever arm 33 and is connected to a right angle lever arm 34. Arms 29, 33 and 34 comprise a first lever section. Arm 34 is connected via pin 36 to a second lever section 38.

Figure 3:
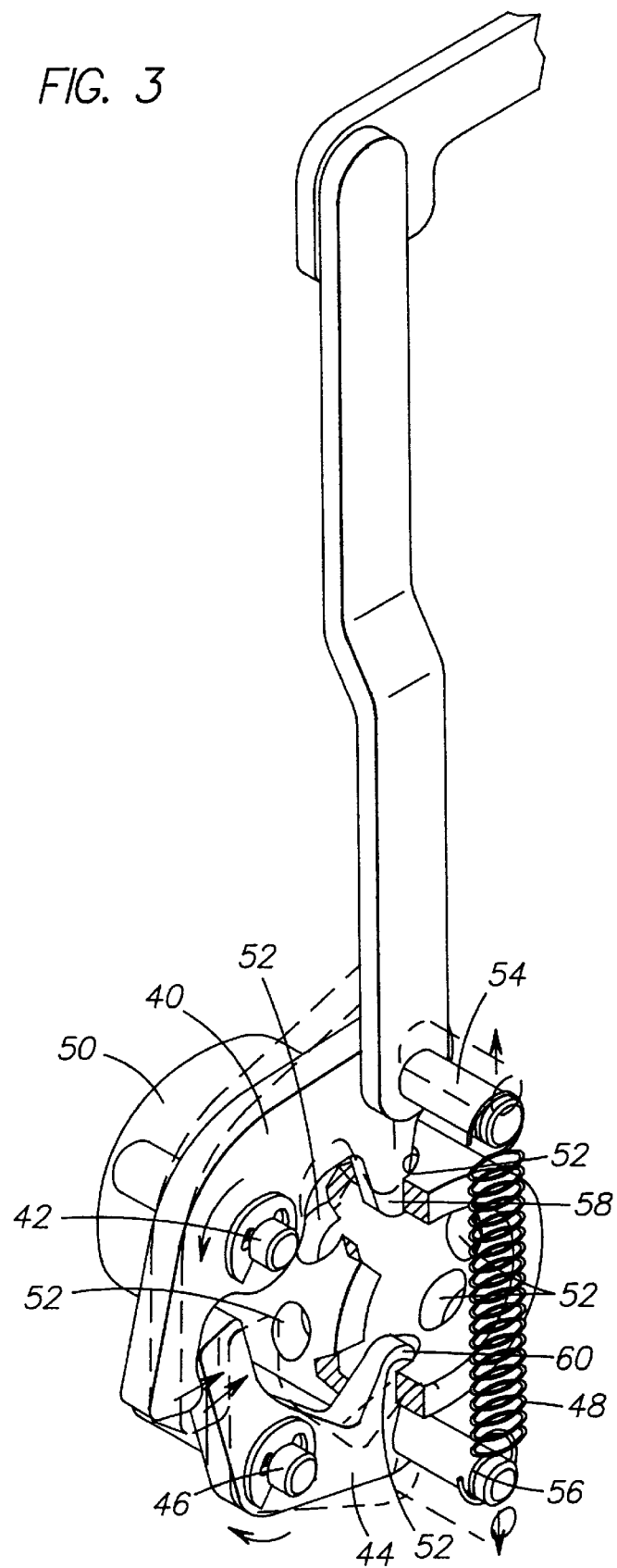
FIG. 3 is an enlarged perspective view, with portions partially broken away and in section, of a detail of the head locking mechanism illustrated in FIGS. 1 and 2.

As shown in greater detail in FIG. 3, locking mechanism 26 further includes a first pawl 40. The proximal end of lever section 38 is connected to pawl 40 via a pin 54. Pawl 40 rotates about pivot 42. Locking mechanism 26 also includes a second pawl 44. Pawl 44 rotates about pivot 46 and includes a second pin 56.

Each of the pawls 40, 44 includes a respective tapered arm 58, 60. Pins 54, 56 are respectively in substantial vertical alignment with arms 58, 60. An extension spring 48 is supported by pins 54, 56.

Fixed pivot 50 includes a plurality of circumferentially spaced slots 52. In the preferred embodiment, fixed pivot 50 includes three pairs of circumferentially spaced slots 52.

Slots 52 define discrete angular positions for head 14 relative to base 16. One pair of slots defines a zero degree angular position; a second pair of slots provides a 45° angular position; and a third pair of slots provides a 90° angular position. FIG. 1 illustrates the head in the 90° angular position, while FIG. 2 illustrates the head in its 45° angular position. Arms 58 and 60 of pawls 40 and 44 are maintained in one of the pair of slots to obtain a first angular position; the arms are placed in a second pair of the slots to achieve a second angular position and the arms are placed in a third of the pairs of slots to obtain the third of the angular positions.

As shown in FIG. 3, arms 58 and 60 are preferably tapered. Spring 48 maintains the arms in the selected slots once a desired angular position for head 14 has been obtained. It should be understood that the number of pairs of slots 52 on fixed pivot 50 may be varied and other means may be employed, such as torsion springs, to bias tapered arms 58, 60 within slots 52.

In operation, assume the user has initially rotated head 14 so that it is in the 45° angular position relative to base 16 as shown in FIG. 2. In this position, the user may readily remove or insert desired mixer accessories. Arms 58, 60 are biased by spring 48 within a pair of slots to maintain the head in the desired discrete angular position relative to the base.

When the user is ready to commence use of mixer 10, head 14 will be rotated in a counterclockwise direction so that the head is at a 90° angular position relative to the base.

To unlock locking mechanism 26, the user rotates lever actuator 28 in a counterclockwise direction about pivot 32. The counterclockwise movement of actuator 28 results in upward movement of second lever section 38 through lever arms 33, 34. The upward movement of lever section 38 results in first pawl 40 pivoting in a counterclockwise direction about pivot 42. The counterclockwise movement of pawl 40 results in arm 58 of pawl 40 being removed from the slot into which it is then positioned. Rotation of pawl 40 also results in pawl 44 rotating in a clockwise direction about pivot 46. This clockwise movement of pawl 44 results in arm 60 also being removed from the slot in which it is then positioned. The release of arms 58, 60 from their respective slots 52 enables the user to pivot head 14 about fixed pivot 50 to a new desired discrete angular position relative to base 16.

When the head is repositioned at a desired angular position relative to the base, as defined by additional slots 52, spring 48 forces arms 58, 60 into the respective slots when the arms are aligned with the slots. In the event that the mixer is used to mix heavy doughs, and high forces are generated which tend to lift the head upwardly relative to the base, the tapered arms 58, 60 wedge further into slots 52 to firmly lock head 14 in a desired angular position relative to pedestal 16.

When the user desires to rotate head 14 relative to pedestal 16 to a new angular position, the user merely presses downwardly on lever actuator 28 and through the actuation of lever arms 33, 34 and 38, and pawls 40, 44, tapered arms 58, 60 are easily removed from slots 52 to enable head 14 to pivot about fixed pivot 50.

The locking mechanism of the present invention is very effective in obtaining the desired locking of the head relative to the base and is relatively inexpensive to manufacture.

While a preferred embodiment of the present invention has been described and illustrated, the invention should not be limited thereto, but may be otherwise embodied within the scope of the following claims.

What is claimed is:

1. A food mixing appliance having a mixing head pivotably supported on a pedestal and a mechanism for locking said head relative to said pedestal in a selected one of several discrete positions and for unlocking the head from the pedestal for enabling the head to be freely pivoted relative to the pedestal, said locking mechanism comprising;

a user accuated pivotable lever extending between said head and said pedestal;

a first pawl mounted on said pedestal and pivotably connected to said lever;

a second pawl mounted on said pedestal and spaced from said first pawl and pivotable in response to pivotable motion of said first pawl, each of said pawls including an arm having a taper at one end;

a member fixed in position relative to said lever and said pedestal including means defining a plurality of discrete positions for said pivotable head relative to said pedestal, each of said tapered ends of said arms of said pawls engaging a selected one of said discrete position defining means for locking said head in said selected discrete position, said lever being pivoted to pivot said pawls and release said arms of said pawls from said discrete position defining means for enabling said head to be pivoted relative to said pedestal.

2. A food mixing appliance in accordance with claim 1 further including spring means for biasing said pawl arms into engagement with said discrete position defining means.

3. A food mixing appliance in accordance with claim 2 wherein said fixed position member includes a non-rotatable shaft mounted in the pedestal.

4. A mixing appliance in accordance with claim 3 wherein said shaft includes a plurality of circumferentially spaced slots, the tapered arms of said pawls engaging selected pairs of said slots to lock said head relative to said pedestal at a desired angle.

5. A food mixing appliance in accordance with claim 4 wherein there are three pairs of slots forming said discrete position defining means.

6. A food mixing appliance in accordance with claim 1 wherein said fixed position member includes a non-rotatable shaft mounted in the pedestal.

7. A food mixing appliance in accordance with claim 6 wherein said shaft includes a plurality of circumferentially spaced slots, the tapered arms of said pawls engaging selected pairs of said slots to lock said head relative to said pedestal at a desired angle.

8. A food mixing appliance in accordance with claim 7 wherein there are three pairs of slots forming discrete positions for said head relative to said pedestal at 0°, 45° and 90°.

9. A food mixing appliance in accordance with claim 1 wherein discrete position defining means includes a plurality of circumferentially spaced slots, the tapered arms of said pawls engaging selected pairs of said slots to lock said head relative to said pedestal at a desired angle.

10. A food mixing appliance in accordance with claim 9 wherein there are three pairs of slots forming discrete positions for said head relative to said pedestal at 0°, 45° and 90°.

11. A locking mechanism to enable a user to adjust the angle of a head member relative to a base member of a stand mixer comprising:

a user operated lever arm extending between said head and base members;

a first pawl mounted on said base member and pivotably attached to an end of the lever arm;

a second pawl mounted on said base member and engaging with said first pawl and pivotable in response to pivotable movement of said first pawl, each of said pawls including an arm;

a first member fixed in position relative to said base member and including slots defining discrete positions for said head member relative to said base member, the arm of each pawl extending into a selected slot for locking the head member relative to the base member, actuation of said lever by the user pivoting said pawls to disengage the arms from the slots and enabling the head member to be rotated relative to the base member.

12. A locking mechanism in accordance with claim 11 further including spring means affixed to each arm for biasing each arm into a corresponding slot.

13. A locking mechanism in accordance with claim 12 wherein the end of each arm engaging a slot is tapered.

14. A locking mechanism in accordance with claim 13 further including three pairs of slots forming discrete angular positions for said head member relative to said base member at 0°, 45° and 90°.

15. A locking mechanism in accordance with claim 11 wherein the end of each arm engaging a slot is tapered.

16. A locking mechanism in accordance with claim 15 wherein there are three pairs of slots forming discrete angular positions for said head member relative to said base member at 0°, 45° and 90°.

17. A locking mechanism in accordance with claim 11 wherein there are three pairs of slots forming discrete angular positions for said head member relative to said base member at 0°, 45° and 90°.

* * * * *